US008339399B2

(12) United States Patent
Snow

(10) Patent No.: US 8,339,399 B2
(45) Date of Patent: Dec. 25, 2012

(54) DECLUSTERING POINT-OF-INTEREST ICONS

(75) Inventor: Bradford J Snow, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1424 days.

(21) Appl. No.: 11/930,367

(22) Filed: Oct. 31, 2007

(65) Prior Publication Data

US 2009/0110302 A1 Apr. 30, 2009

(51) Int. Cl.
*G06T 11/20* (2006.01)
*G09G 5/00* (2006.01)
*G06F 3/048* (2006.01)

(52) U.S. Cl. .................. 345/440; 345/630; 715/765

(58) Field of Classification Search .................. 345/440, 345/630; 715/765
See application file for complete search history.

(56) References Cited

U.S. PATENT DOCUMENTS

| 5,519,809 | A | 5/1996 | Husseiny et al. | |
|---|---|---|---|---|
| 5,758,264 | A | 5/1998 | Bonta et al. | |
| 5,852,810 | A | 12/1998 | Sotiroff et al. | |
| 5,945,985 | A | 8/1999 | Babin et al. | |
| 6,092,076 | A | 7/2000 | McDonough et al. | |
| 6,405,129 | B1 * | 6/2002 | Yokota | 701/438 |
| 6,640,185 | B2 * | 10/2003 | Yokota et al. | 701/455 |
| 6,772,195 | B1 * | 8/2004 | Hatlelid et al. | 709/204 |
| 6,856,901 | B2 * | 2/2005 | Han | 701/532 |
| 6,883,146 | B2 | 4/2005 | Prabhu et al. | |
| 6,983,203 | B1 * | 1/2006 | Wako | 701/533 |
| 6,995,778 | B2 * | 2/2006 | Noble et al. | 345/632 |
| 7,076,741 | B2 * | 7/2006 | Miyaki | 715/837 |
| 7,343,046 | B2 | 3/2008 | Curry et al. | |
| 7,570,272 | B2 | 8/2009 | Dooley et al. | |
| 2002/0065605 | A1 * | 5/2002 | Yokota | 701/211 |
| 2002/0163547 | A1 | 11/2002 | Abramson et al. | |
| 2003/0011601 | A1 * | 1/2003 | Itoh et al. | 345/440 |
| 2004/0243306 | A1 * | 12/2004 | Han | 701/211 |
| 2005/0107949 | A1 * | 5/2005 | Yokota | 701/209 |
| 2005/0219268 | A1 * | 10/2005 | Kyle | 345/660 |
| 2005/0251331 | A1 | 11/2005 | Kreft | |
| 2006/0080032 | A1 | 4/2006 | Cooper et al. | |
| 2006/0184313 | A1 | 8/2006 | Butler | |
| 2007/0050129 | A1 | 3/2007 | Salmre | |
| 2008/0005674 | A1 | 1/2008 | Wattenberg et al. | |

(Continued)

OTHER PUBLICATIONS

Boutin F., Hascoet M., Focus Dependent Multi-Level Graph Clustering, Proceedings of Advanced Visual Interface, AVI 2004, May 25-28, 2004, ACM, New York, NY, USA, pp. 167-170.*

(Continued)

*Primary Examiner* — Daniel F Hajnik
*Assistant Examiner* — Roberta D Prendergast
(74) *Attorney, Agent, or Firm* — Wolfe-SBMC

(57) ABSTRACT

Super-clusters of point-of-interest locations are created based on how close the point-of-interest locations are to one another. Additionally, one or more mini-clusters are created in each of the super-clusters based on how close the point-of-interest locations within each super-cluster are to one another. For each of one or more mini-clusters, some point-of-interest icons corresponding to the point-of-interest locations are placed based at least in part on a mean out positioning vector that is based at least in part on a center of the mini-cluster and a center of the super-cluster that includes the mini-cluster. Additionally, some point-of-interest icons are attempted to be placed as a group, while others are attempted to be placed individually.

20 Claims, 10 Drawing Sheets

U.S. PATENT DOCUMENTS

| | | |
|---|---|---|
| 2008/0059889 A1 | 3/2008 | Parker et al. |
| 2008/0086356 A1 | 4/2008 | Glassman et al. |
| 2008/0281869 A1 | 11/2008 | Liu et al. |
| 2009/0024315 A1 | 1/2009 | Scheibe |
| 2009/0100363 A1* | 4/2009 | Pegg et al. ............... 715/765 |
| 2009/0110302 A1 | 4/2009 | Snow |
| 2010/0023259 A1 | 1/2010 | Krumm et al. |
| 2010/0088631 A1 | 4/2010 | Schiller |
| 2011/0010650 A1 | 1/2011 | Hess et al. |
| 2011/0173572 A1 | 7/2011 | van Zwol et al. |
| 2011/0225541 A1 | 9/2011 | Ramos |
| 2011/0225546 A1 | 9/2011 | Ramos |

OTHER PUBLICATIONS

"VidaOne GPS Pocket PC User's Guide", VidaOne Inc.,2007, pp. 1-22.

"Working with Pushpin Layers", 2007, Microsoft Inc, pp. 1-3.

"ArcPad StreetMap: Street-Level Data, Geocoding, and Routing for Mobile Systems", 2003, ESRI, Pges-14.

Varhol, "Mashing Up Using Virtual Earth", Sep. 15, 2006, pp. 6.

"Auto-Highlight Areas of Any Map Image", Retrieved from: <http://www.webresourcesdepot.com/auto-highlight-areas-of-any-map-image/> on Feb. 3, 2010 (Feb. 12, 2008),2 pages.

"EveryBlock Seattle: Seattle Local News and Public Records", Retrieved from: <http://seattle.everyblock.com/> on Feb. 2, 2010, 2 pages.

"What does OECD eXplorer enable you to do? An introduction to its main features", Available at <http://www.oecd.org/dataoecd/55/47/44084514.pdf>,(Jun. 29, 2009),pp. 1-33.

Beran, Bora "HYDROSEEK: An Ontology-Aided Data Discovery System for Hydrologic", *Thesis, Drexel University*, Available at <http://citeseerx.ist.psu.edu/viewdoc/download?doi=10.1.1.93.145&rep=rep1&type=pdf>,(Sep. 2007),pp. 1-145.

Burigat, Stefano et al., "Decluttering of Icons Based on Aggregation in Mobile Maps", *Map-based Mobile Services—Design, Interaction and Usability, Springer*, Berlin, 2008, Available at <http://bilder.buecher.de/zusatz/23/23169/23169025__lese__1.pdf>,(Aug. 2008),21 pages.

Crampton, Jeremy W., "Interactivity Types in Geographic Visualization", *Cartography and Geographic Information Science*, vol. 29, No. 2, Available at <http://www.geog.psu.edu/courses/geog421/private/Crampton%20galleys.pdf>,(Apr. 2002),pp. 1-15.

Khan, Azam "Spotlight: Directing Users' Attention on Large Displays", *CHI 2005, Papers: Enhancing Virtual Spaces and Large Displays*, Available at <http://portal.acm.org/citation.cfm?id=1054972.1055082>,(Apr. 2004),pp. 791-798.

Kleiweg, Peter et al., "Geographic Projection of Cluster Composites", *Diagrammatic Representation and Inference, Third International Conference, Diagrams 2004*, Cambridge, UK, Available at <http://www.let.rug.nl/~kleiweg/papers/kleiweg04.pdf>,(Mar. 2004),3 pages.

Mathewson, Tim et al., "Realtime Observation Monitoring and Analysis Network", *A National Joint Project Between Interagency Meteorologists and the University of Utah*, Available at <http://www.blm.gov/colorado/rmafwx/roman.pdf>,(2003),22 pages.

Mummidi, Lakshmi et al., "Discovering Points of Interest from Users' Map Annotations", *Reprint of version in GeoJournal 2008*, Available at <http://research.microsoft.com/en-us/um/people/jckrumm/Publications%0202008/map%20annotationsl%20preprint.pdf>,(2008),pp. 1-25.

Popescu, Adrian et al., "Creating Visual Summaries for Geographic Regions", *Institut TELECOM Bretagne*, Available at <http://georama-project.labs.exalead.com/publication/popescu__kanellos__final.pdf>,(Apr. 6, 2009),6 pages.

Ramos, Gonzalo et al., "Tumble! Splat! Helping Users Access and Manipulate", *AVI 2006*, (May 2006),pp. 428-435.

* cited by examiner

100

DECLUSTERING POINT-OF-INTEREST ICONS

BACKGROUND

The display of maps on devices, such as desktop computers, mobile devices, automotive navigation devices, and so forth, has become commonplace. These maps also oftentimes display point-of-interest (POI) icons or "pushpins" that identify particular points of interest on the maps. For example, if a user does a search for hotels in a particular city, a map of that city with a POI icon for each of the hotels can be displayed. However, as multiple POI icons can be displayed on the same map, these POI icons can oftentimes overlap or occlude one another.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the declustering point-of-interest icons, super-clusters of point-of-interest locations are created based on how close the point-of-interest locations are to one another. Additionally, one or more mini-clusters are created in each of the super-clusters based on how close the point-of-interest locations within each super-cluster are to one another. For each of one or more mini-clusters, point-of-interest icons corresponding to the point-of-interest locations are placed based at least in part on a mean out positioning vector. This mean out positioning vector is based at least in part on a center of the mini-cluster and a center of the super-cluster that includes the mini-cluster.

In accordance with one or more aspects of the declustering point-of-interest icons, super-clusters of point-of-interest locations are created. Additionally, one or more mini-clusters of point-of-interest locations are created within each super-cluster. For each mini-cluster having a single point-of-interest location, a point-of-interest icon corresponding to the single point-of-interest location is placed for display. Furthermore, for each mini-cluster having multiple point-of-interest locations, an attempt is made to place point-of-interest icons corresponding to the multiple point-of-interest locations as a group. If the attempted group placement is unsuccessful, then the point-of-interest icons corresponding to the multiple point-of-interest locations are placed individually.

BRIEF DESCRIPTION OF THE DRAWINGS

The same numbers are used throughout the drawings to reference like features.

DETAILED DESCRIPTION

Declustering point-of-interest icons is discussed herein. Generally, the locations of points of interest (POIs) on an image for which corresponding point-of-interest (POI) icons are to be displayed are analyzed and clustered together into multiple clusters. A POI icon is then displayed on the image for each of these points of interest, with an attempt made to display the POI icons so that they extend out from the centers of these clusters.

Figure 1:
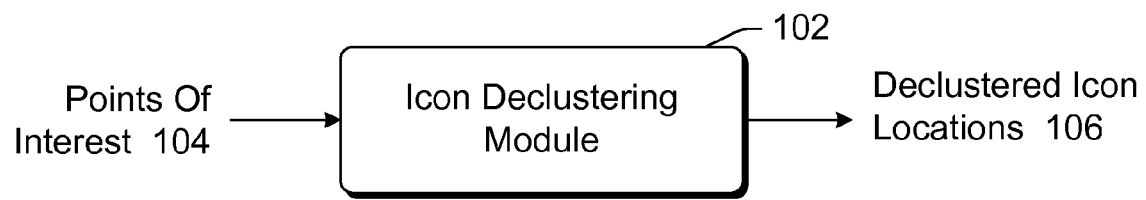
FIG. 1 illustrates an example system employing declustering point-of-interest icons.

FIG. 1 illustrates an example system 100 employing the declustering point-of-interest icons discussed herein. An icon declustering module 102 receives points of interest 104 and generates declustered POI icon locations 106 corresponding to the points of interest 104. The declustering refers to spreading out the POI icons so that the number of POI icons that overlap or occlude one another are reduced or eliminated altogether. This results in a more visually appealing and useful display as more of the icons can be seen by the user.

Points of interest 104 can be received from any of a variety of different sources. Oftentimes points of interest 104 are received as search results, although they may alternatively be received from other sources. For example, points of interest 104 can be received from a database or file of points of interest that correspond to a map or other image, can be manually identified by the user of system 100 or another user, can be part of a previously selected list of points of interest selected by the user of system 100 or another user, and so forth.

Icon declustering module 102 determines the locations of the POI icons corresponding to the received POIs 104. Module 102 determines the locations so that the POI icons appear to extend out from or "explode" out from centers of clusters of POIs. This allows the number of POI icons that overlap or occlude another POI icon to be reduced. The manner in which the locations of the POI icons is determined is discussed in more detail below.

The POI icons can be generated by module 102, or alternatively can be generated by another component or module (not shown). The POI icons can have any of a variety of different appearances. In one or more embodiments, the POI icons have the appearance of pushpins, and may optionally have a number associated therewith (e.g., corresponding to a separate numbered list with information describing the POI associated with that POI icon). Alternatively, the POI icons can have different appearances, such as a circle (or other geometric shape) with or without an identifying number or information within it, a logo or name describing the POI (e.g., if the POI is a business then a logo of the business), and so forth.

The POI icons are discussed herein primarily with reference to being displayed on maps. It is to be appreciated, however, that maps are one type of image. The techniques discussed herein can be used to identify points of interest on any of a wide variety of different types of images.

Figure 2:
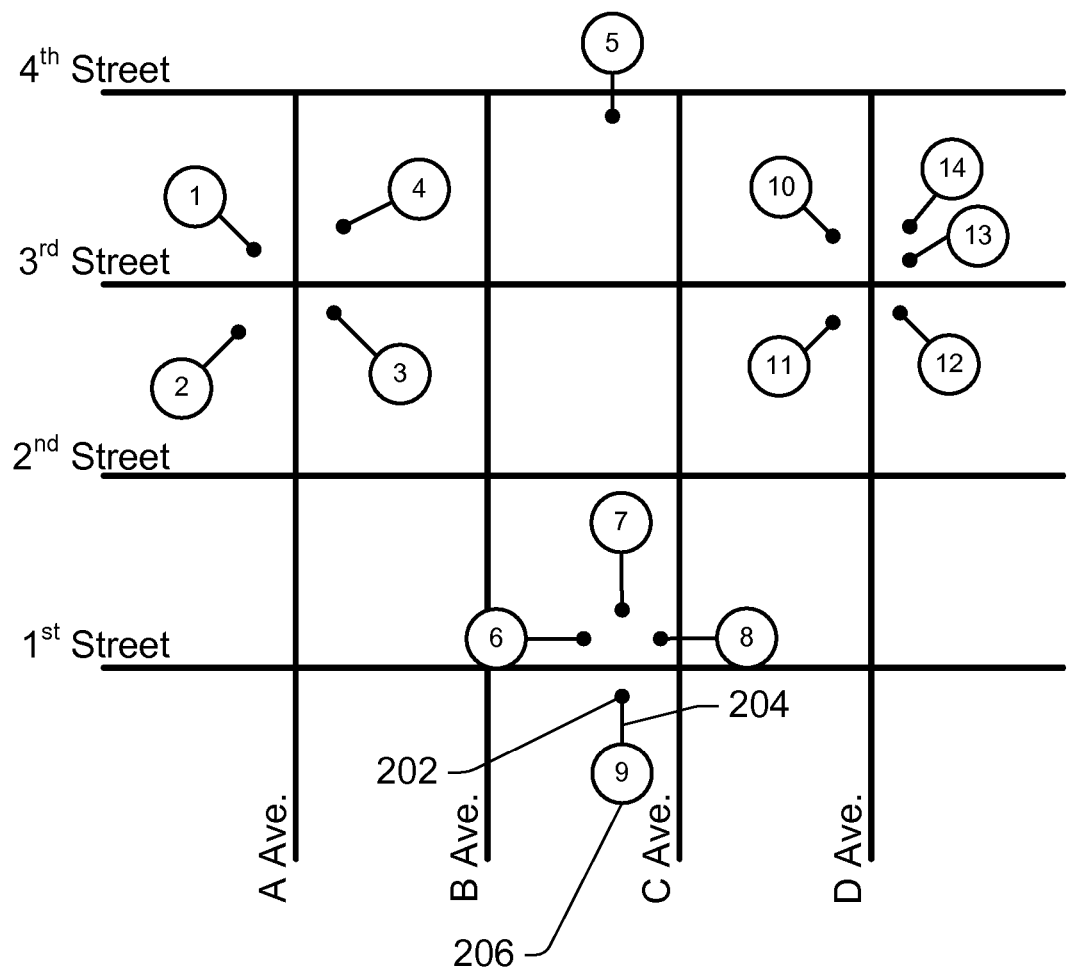
FIG. 2 illustrates an example map with declustered point-of-interest icons.

FIG. 2 illustrates an example map 200 with declustered point-of-interest icons. Map 200 is a street map showing multiple streets with multiple points of interest displayed. Each POI is displayed as a darkened-in circle. For each POI, a leader line extends from the darkened-in circle to a POI icon. In the example of FIG. 2, the POI icons are circles with numeric identifiers within the circles. These numeric identifiers correspond to a separate list (not shown) of information describing the POI. For example, one POI is identified by darkened-in circle 202. A leader line 204 extends from darkened-in circle 202 to POI icon 206. POI icon 206 has a numeric identifier of "9". A separate list (not shown) can be displayed that describes what "9" represents on map 200 (e.g., a restaurant, a hotel, a scenic viewpoint, etc.).

In the discussions herein, the leader lines are straight lines. Alternatively, leader lines of any other shape can be used, such as leader lines including various angles or curves, zig-zagged (e.g., lightning bolt) lines, and so forth.

Figure 3A:
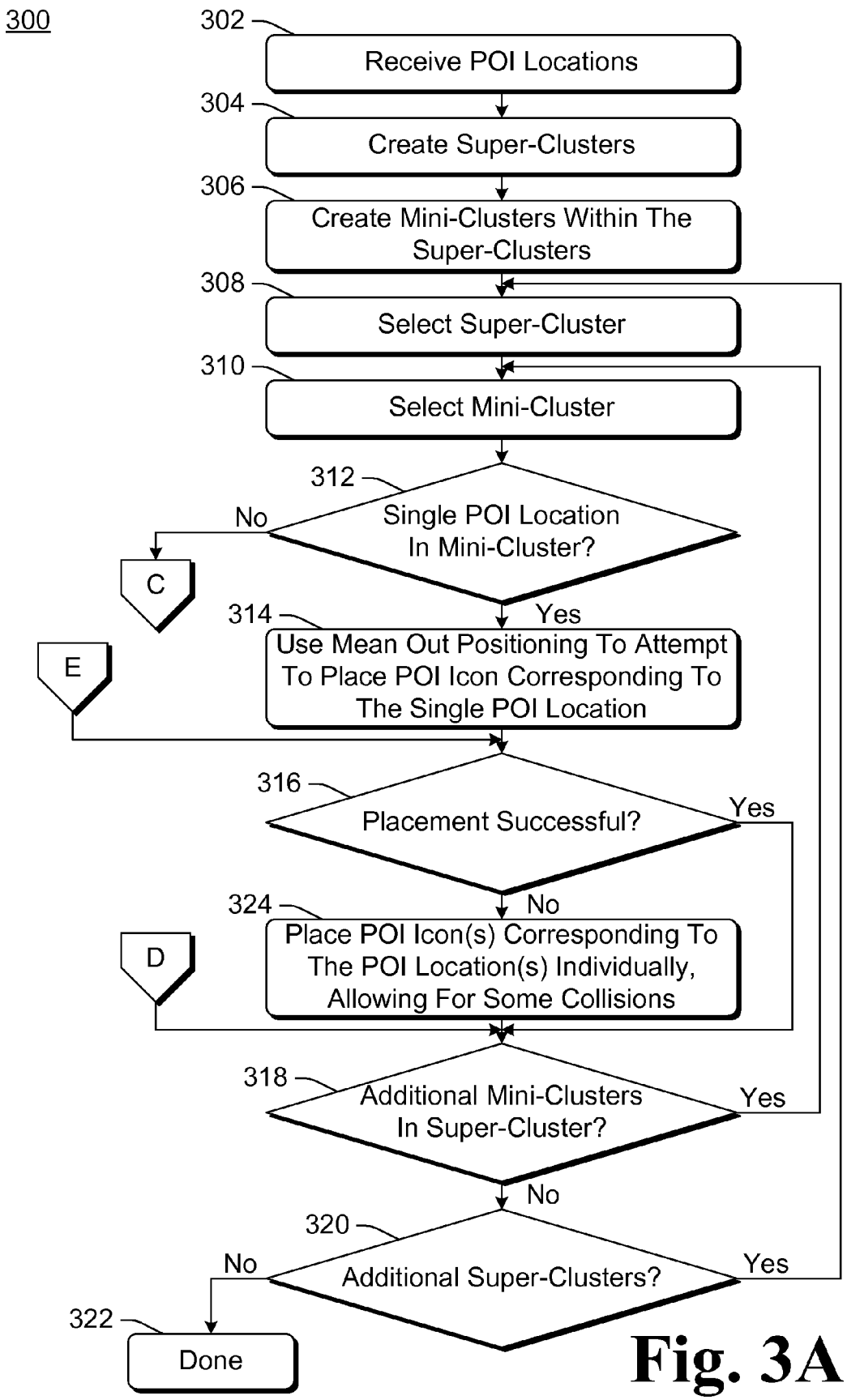
FIGS. 3A and 3B are a flowchart illustrating an example process for declustering point-of-interest icons.
Figure 3B:
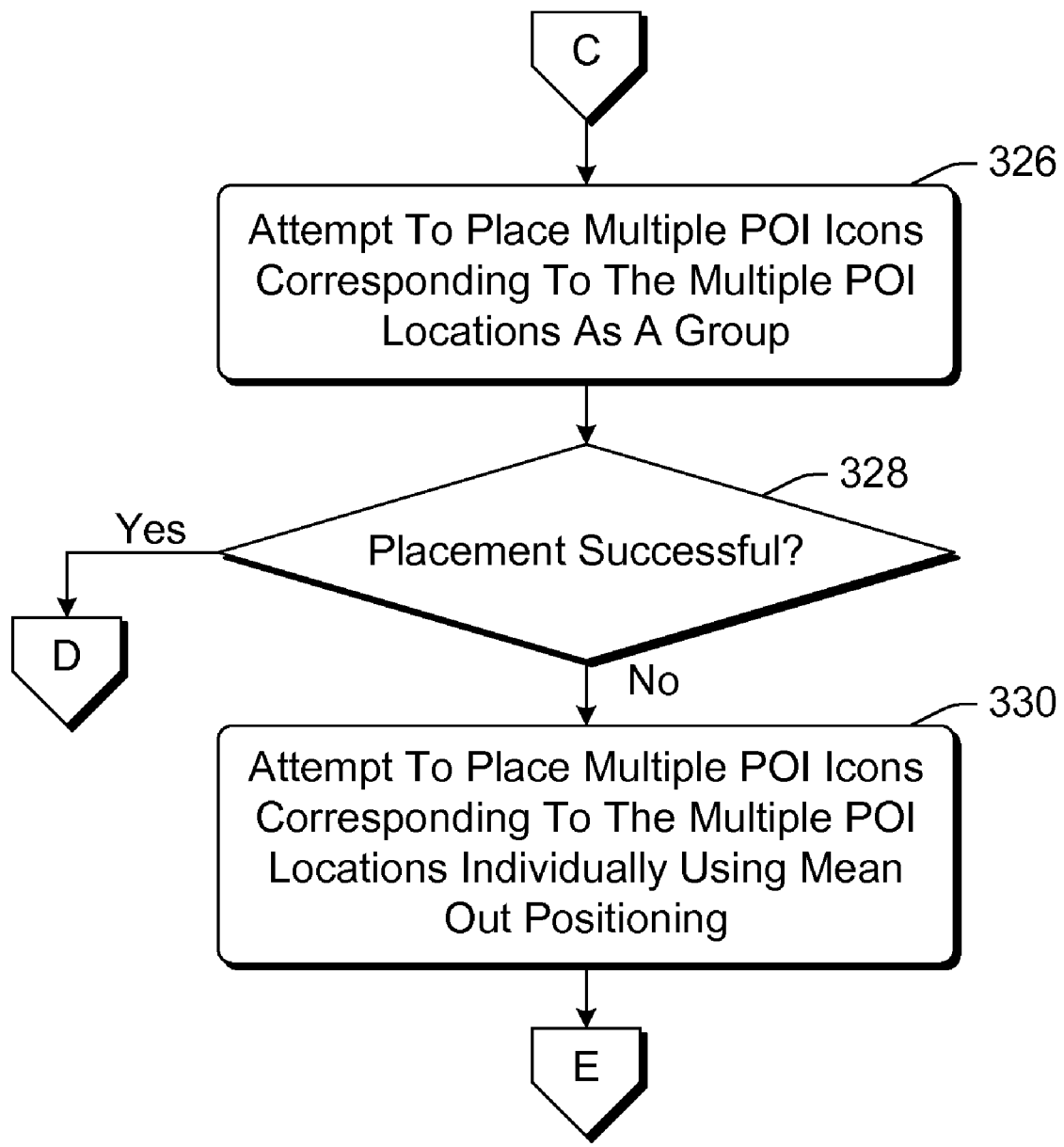

FIGS. 3A and 3B are a flowchart illustrating an example process 300 for declustering point-of-interest icons. Process 300 is carried out by a device, such as a device implementing module 102 of FIG. 1, and can be implemented in software, firmware, hardware, or combinations thereof.

In the discussions herein, placement of POI icons is discussed. It is to be appreciated that, for each attempted placement of a POI icon, the leader line extending from the POI icon to the POI location is also placed. Any checks regarding whether an attempted placement was successful includes checking for collisions with these leader lines.

Initially, a set of one or more point-of-interest locations are received (act 302). The manner in which these locations are identified can vary. In one or more embodiments, the POI locations are received as display locations. These display locations refer to the locations on the display of the map where the POI locations are being displayed. Alternatively, these locations as received in act 302 can be identified in different manners, such as latitude and longitude coordinates, which are then converted to display locations.

One or more super-clusters are then created for the set of POI locations (act 304). Generally, each super-cluster includes one or more POI locations that are relatively close to one another. These super-clusters can be created in any of a variety of different manners that group the POI locations together.

Additionally, one or more mini-clusters within each super-cluster are also created (act 306). Generally, each mini-cluster within a super-cluster includes one or more POI locations within that super-cluster that are relatively close to one another. These mini-clusters can be created in any of a variety of different manners that group the POI locations within the super-clusters together.

Figure 4:
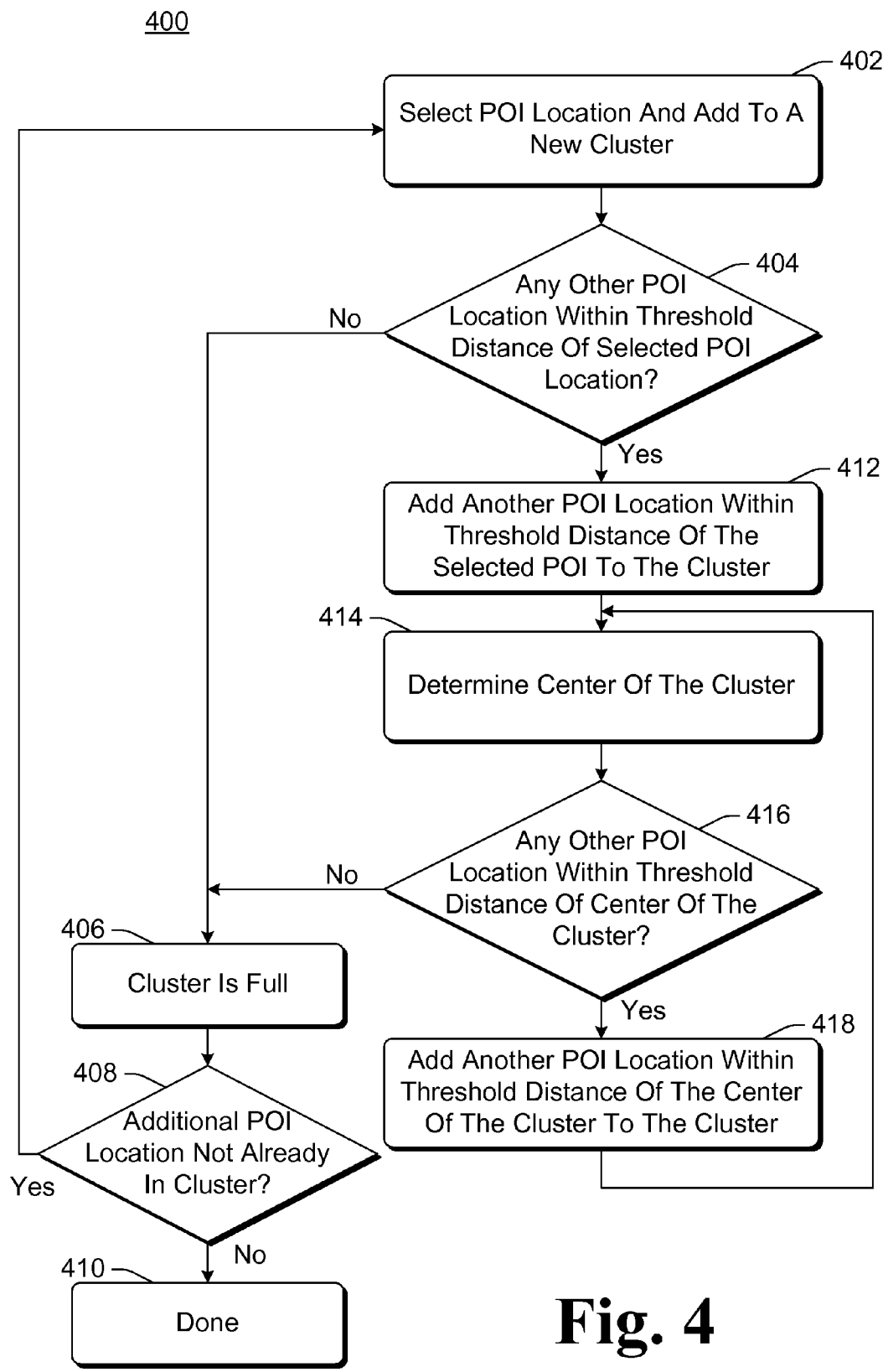
FIG. 4 is a flowchart illustrating an example process for creating clusters.

FIG. 4 is a flowchart illustrating an example process 400 for creating clusters. Process 400 is carried out by a device, such as a device implementing module 102 of FIG. 1, and can be implemented in software, firmware, hardware, or combinations thereof. In one or more embodiments, process 400 performs the super-cluster creation of act 304 of FIGS. 3A and 3B, as well as the mini-cluster creation of act 306.

Process 400 operates based on a set of POI locations that are to be added to clusters. In one or more embodiments, these POI locations are the locations received in act 302 of FIGS. 3A and 3B that are to be added to super-clusters. Additionally, in one or more embodiments these POI locations are the POI locations within a super-cluster that are to be added to the mini-clusters in act 306 of FIGS. 3A and 3B.

Initially, one of the POI locations is selected and added to a new cluster (act 402). The POI location can be selected in any of a variety of manners, such as randomly, based on the locations of the POI locations (e.g., starting in a particular corner of the screen, starting in the center of the screen, etc.), based on concentrations of POI locations (e.g., start where POI locations are most concentrated, start where POI locations are least concentrated, etc.), according to some other algorithm or criteria, and so forth.

A check is then made as to whether there are any other POI locations within a threshold distance of the selected POI location (act 404). The specific threshold distance can vary. In one or more embodiments, the threshold is 20 pixels when the clusters being generated are super-clusters, and 3 pixels when the clusters being generated are mini-clusters. Alternatively, different threshold distances can be used.

If no other POI locations are within the threshold distance of the selected POI location, then the cluster being created is full (act 406). A check is then made as to whether there are any additional POI locations that are not already in a cluster (act 408). If all POI locations have already been assigned to clusters, then the cluster creation process is done (act 410). However, if there are additional POI locations that are not already in a cluster, then one of those POI locations is selected and added to a new cluster (act 402). This selection can be made continuing in the same manner as was used to select the previous POI location(s) in act 402.

Returning to act 404, if there is another POI location within the threshold distance of the selected POI location, then one of the POI location(s) within the threshold distance of the selected POI location is added to the cluster (act 412). If multiple POI locations are within the threshold distance of the selected POI location, then any of those multiple POI locations can be selected to be added to the cluster in act 412. This selection can be performed randomly, based on location (e.g., the POI location closest to the selected POI location is added, the POI location farthest from the selected POI location is added), and so forth.

The center of the cluster is then determined (act 414). The center of a cluster can be determined in any of a variety of different manners. In one or more embodiments, the center is determined by generating a mean location that is the mean of the various POI locations included in the cluster. For example, the POI locations can be identified using an x,y-coordinate system, and the mean of the x-coordinate values of the POI locations in the cluster can be generated to determine a mean x-coordinate value, and the mean of the y-coordinate values of the POI locations in the cluster can be generated to determine a mean y-coordinate value. The center of the cluster would then be the x,y-coordinate having the mean x-coordinate value and the mean y-coordinate value.

A check is then made as to whether there are any other POI locations within the threshold distance of the center of the cluster (act 416). If no other POI locations are within the threshold distance of the center of the cluster, then the cluster being created is full (act 406). Process 400 then proceeds to act 408 to check whether there are any additional POI locations that are not already in a cluster.

However, if there are other POI locations within the threshold distance of the center of the cluster, then one of those POI location(s) within the threshold distance of the center of the cluster is added to the cluster (act 418). If multiple POI locations are within the threshold distance of the center of the cluster, then any of those multiple POI locations can be selected to be added to the cluster in act 418, analogous to the discussion above regarding act 412. Process 400 then returns to act 414 to determine a new center of the cluster.

It should be noted that process 400 is an example of a process that can be used to create clusters. Various modifications can alternatively be made to process 400. For example, in process 400 the center of the cluster may not be recalculated in act 414 (rather, process 400 may proceed from act 418 to act 416). By way of another example, the threshold distance in act 416 may be determined with reference to the initial POI location added to the cluster rather than based on a center of the cluster.

Figure 5:
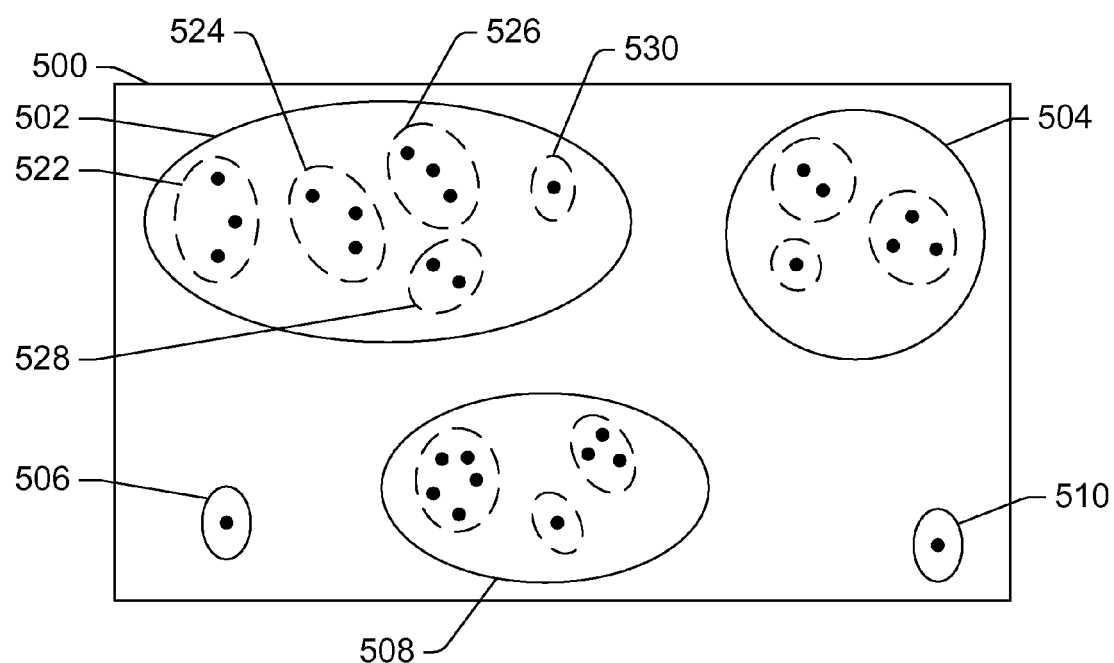
FIG. 5 illustrates an example of the super-clusters and mini-clusters.

FIG. 5 illustrates an example of the super-clusters and mini-clusters. A map 500 is illustrated including super-clusters 502, 504, 506, 508, and 510. POI locations in map 500 are illustrated with darkened-in circles. Super-clusters 502, 504, and 508 include multiple POI locations, while super-clusters 506 and 510 each include a single POI location. Super-clusters with a single POI location can also be referred to as including a single mini-cluster that in turn includes that single POI location. Within super-clusters 502, 504, and 508, multiple mini-clusters have been created and are denoted using dashed lines. Some of these mini-clusters include multiple POI locations, while others include a single POI location. For example, super-cluster 502 includes mini-clusters 522, 524, 526, 528, and 530.

Returning to FIGS. 3A and 3B, one of the super-clusters is selected (act 308). This one super-cluster can be selected in different manners. In one or more embodiments, the super-cluster that includes the largest number of POI locations is selected in act 308. Alternatively, the selection in act 308 can be performed randomly, based on a number of mini-clusters in the super-clusters (e.g., the super-cluster that includes the largest number of mini-clusters), based on other algorithms or criteria, and so forth.

Each super-cluster includes one or more mini-clusters. One of the mini-clusters that is within the super-cluster selected in act 308 is selected (act 310). This one mini-cluster can be selected in different manners. In one or more embodiments, the mini-cluster having a center that is closest to the center of the super-cluster is selected in act 310. Alternatively, the selection in act 310 can be performed randomly, based on a number of POI locations in the mini-clusters (e.g., the mini-cluster that includes the largest number of POI locations), based on other algorithms or criteria, and so forth.

A check is then made as to whether the selected mini-cluster includes a single POI location (act 312). If the selected mini-cluster includes a single POI location, then mean out positioning is used to attempt to place a POI icon corresponding to the single POI location (act 314).

Placement or attempted placement of a POI icon at a particular location is discussed herein. A location is typically a single pixel, and POI icons are typically multiple pixels. Accordingly, placing or attempting to place a POI icon at a particular location refers to having a portion of the POI icon at that particular location. This portion of the POI icon can be, for example, a center of the icon, a particular corner of the icon, the portion of the icon adjacent to the leader line for the icon, a portion that varies for different icons on the same map, some other predetermined location of the icon, and so forth.

In order to determine if an attempt to place a POI icon at a particular location is successful (also referred to as being able to place the POI icon at a particular location) as discussed herein, a check is made as to whether the leader line from the POI location to the POI icon, and/or the POI icon itself, when placed at the particular location collides with any other leader line, POI icon, and/or POI location. A collision as discussed herein refers to the situation where the leader line and/or POI icon is to be displayed in any of the same pixels as any other leader line, POI icon and/or POI location. Alternatively, a collision can refer to the situation where the leader line and/or POI icon is to be displayed within a threshold distance (e.g., 2 pixels) of any other leader line, POI icon, and/or POI location.

Mean out positioning is based on the center of the super-cluster and the center of the mini-cluster. In the case of a mini-cluster having a single POI location, the center of the mini-cluster is the single POI location. A vector, referred to as the mean out positioning vector, is identified that is between the center of the super-cluster and the POI location, continuing beyond the POI location. The POI icon is placed along the mean out positioning vector.

Figure 6:
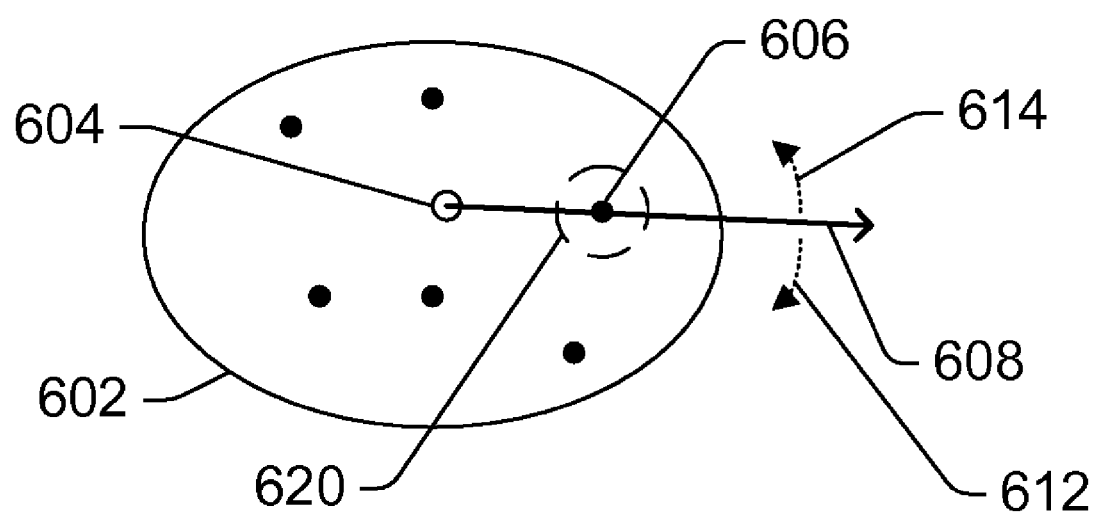
FIG. 6 illustrates an example of mean out positioning.

FIG. 6 illustrates an example of mean out positioning. A super-cluster 602 includes multiple POI locations. All of the mini-clusters within super-cluster 602 have not been shown in FIG. 6 to avoid cluttering the drawing. Super-cluster 602 has a center 604 and a POI location 606, which happens to be the center of a mini-cluster 620. The mean out positioning identifies the vector 608 extending from center 604 through the center of mini-cluster 620 (which is POI location 606).

The POI icon corresponding to POI location 606 is placed along vector 608 if possible. With mean out positioning, an attempt is made to place the POI icon at a default distance from POI location 606. This default distance can vary based on the desires of the system designer (e.g., based on the appearance that he or she desires to create).

If the POI icon cannot be placed at this default distance, then attempts are made to place the POI icon further out along the mean out positioning vector and/or at different angles for the mean out positioning vector. In one or more embodiments a distance threshold is used beyond which the POI icon is not placed. This prevents the POI icon from being placed too far away from the POI location. Changing the angle of the mean out positioning vector is illustrated in FIG. 6, as vector 608 can be rotated clockwise 612 and/or counter-clockwise 614 about center 604. In one or more embodiments an angle threshold is used beyond which the vector is not rotated. The distance threshold and angle threshold can both vary based on the desires of the system designer (e.g., based on the appearance that he or she desires to create).

Returning to FIGS. 3A and 3B, a check is made as to whether the attempt in act 314 was successful (act 316). If the attempt was successful, then a check is made as to whether there are any additional mini-clusters in the super-cluster having POI locations for which POI icons have not yet been placed (act 318). If there are additional mini-clusters, then process 300 returns to act 310 to select one of those mini-clusters. This selection can be made continuing with the same algorithm or criteria as was used to select the previous mini-cluster(s) 310. For example, mini-clusters can be selected following an order corresponding to how close the center of each mini-cluster is to the center of the super-cluster, with mini-clusters being closer to the center of the super-cluster being selected prior to mini-clusters that are further from the center of the super-cluster.

If, however, there are no additional mini-clusters in the super-cluster having POI locations for which POI icons have not yet been placed, then a check is made as to whether there are any additional super-clusters having POI locations for which POI icons have not yet been placed (act 320). If there are additional super-clusters, then process 300 returns to act 308 to select one of those super-clusters. This selection can be made continuing with the same algorithm or criteria as was used to select the previous super-cluster(s). For example, super-clusters can be selected following an order corresponding to how many POI locations are in each super-cluster, with super-clusters including more POI locations being selected prior to super-clusters having fewer POI locations.

If, however, there are no additional super-clusters having POI locations for which POI icons have not yet been placed, then process 300 is done (act 322). Process 300 is done when all of the POI icons corresponding to the received POI locations from act 302 have been placed.

Returning to act 316, if the attempted placement in act 314 was not successful, then the POI icon corresponding to the POI location is placed individually, allowing for some collisions (act 324). The collisions permitted can be, for example, collisions between leader lines, collisions between leader lines and origin points, collisions between leader lines and other POI icons. Once placed, process 300 proceeds to check whether there are any additional mini-clusters in the super-cluster (act 318).

Returning to act 312, if the selected mini-cluster includes more than one POI location, then an attempt is made to place the multiple POI icons corresponding to the multiple POI locations in the mini-cluster as a group (act 326). In one or more embodiments, this attempt to place the multiple POI icons as a group uses a fan technique. Using the fan technique, a circle is generated at a default distance from the center of the mini-cluster. This default distance can vary based on the desires of the system designer (e.g., based on the appearance that he or she desires to create). The multiple POI icons are placed on this circle at equal distances and angles from each other. For example, if there were four POI icons to be placed, then the four POI icons would be placed on the circle at 90 degree distances from one another. A check is then made as to whether there are no collisions for the POI icons placed on the circle. If there are no collisions, then the placement attempt was successful.

If there is a collision for at least one of the POI icons, then the circle is rotated along with the POI icons about the center of the mini-cluster, so the position of the POI icons on the circle changes. The amount of this rotation can vary, such as rotating one degree at a time, rotating five degrees at a time, rotating sufficiently to move each POI icon at least one pixel, and so forth. Checks are made as to whether there are no collisions for the POI icons placed on the circle as the circle is rotated. If a placement is found where there are no collisions, then the placement attempt was successful.

If the circle is rotated all the way around (e.g., 360 degrees) with no placement attempt being successful, then the circle can be extended out and/or the circle can be reduced to an arc (e.g., less than 360 degrees). The circle can be reduced to an arc in different manners, and in one or more embodiments the circle is reduced in the following sequence: a half-circle, a third-circle, a quarter-circle, a fifth-circle, and so forth. In one or more embodiments, the location of the arc, prior to beginning rotation, is in the same direction as the mean out positioning vector for the mini-cluster. The circle can be extended out in different manners, such as by a single pixel, three pixels, a multiple (e.g., twice) of the current radius of the circle, and so forth.

As the circle and/or arc is extended out and/or reduced, it is again rotated about the center of the mini-cluster and checks are performed as to whether the placement of the POI icons results in no collisions. When the circle has been reduced to an arc, the arc is rotated about the center of the mini-cluster with the POI maintaining their locations on the arc. In one or more embodiments a distance threshold is used beyond which the circle and/or arc is not extended so as to prevent the POI icons from being placed too far away from the POI locations. Additionally, in one or more embodiments, a reduction threshold is used beyond which the arc is no longer reduced so as to prevent too small an arc from being used. The distance threshold and reduction threshold can vary based on the desires of the system designer (e.g., based on the appearance that he or she desires to create).

A check is then made as to whether the placement attempt in act 326 was successful (act 328). If the attempt was successful, then process 300 proceeds to act 318 to check whether there are any additional mini-clusters in the super-cluster. However, if the attempt was not successful, then an attempt is made to place the multiple POI icons corresponding to the multiple POI locations individually using mean out positioning (act 330). This attempt to place each of the multiple POI icons individually is analogous to the single POI location positioning attempt discussed above with respect to act 314, although the center of the mini-cluster will not necessarily be one of the POI locations.

Process 300 then proceeds to check whether the placement of act 330 was successful (act 316). This check in act 316 is a check for the individual POI icons, as some of the POI icons may have been successfully placed in act 330 while other POI icons were not. If all of the individual POI icons were successfully placed, then process 300 proceeds to act 318 to check whether there are any additional mini-clusters in the super-cluster. However, if any of the individual POI icons were not successfully placed, then process 300 proceeds to act 324 to place any of the multiple POI icons that were not successfully placed in act 330.

Figure 7A:
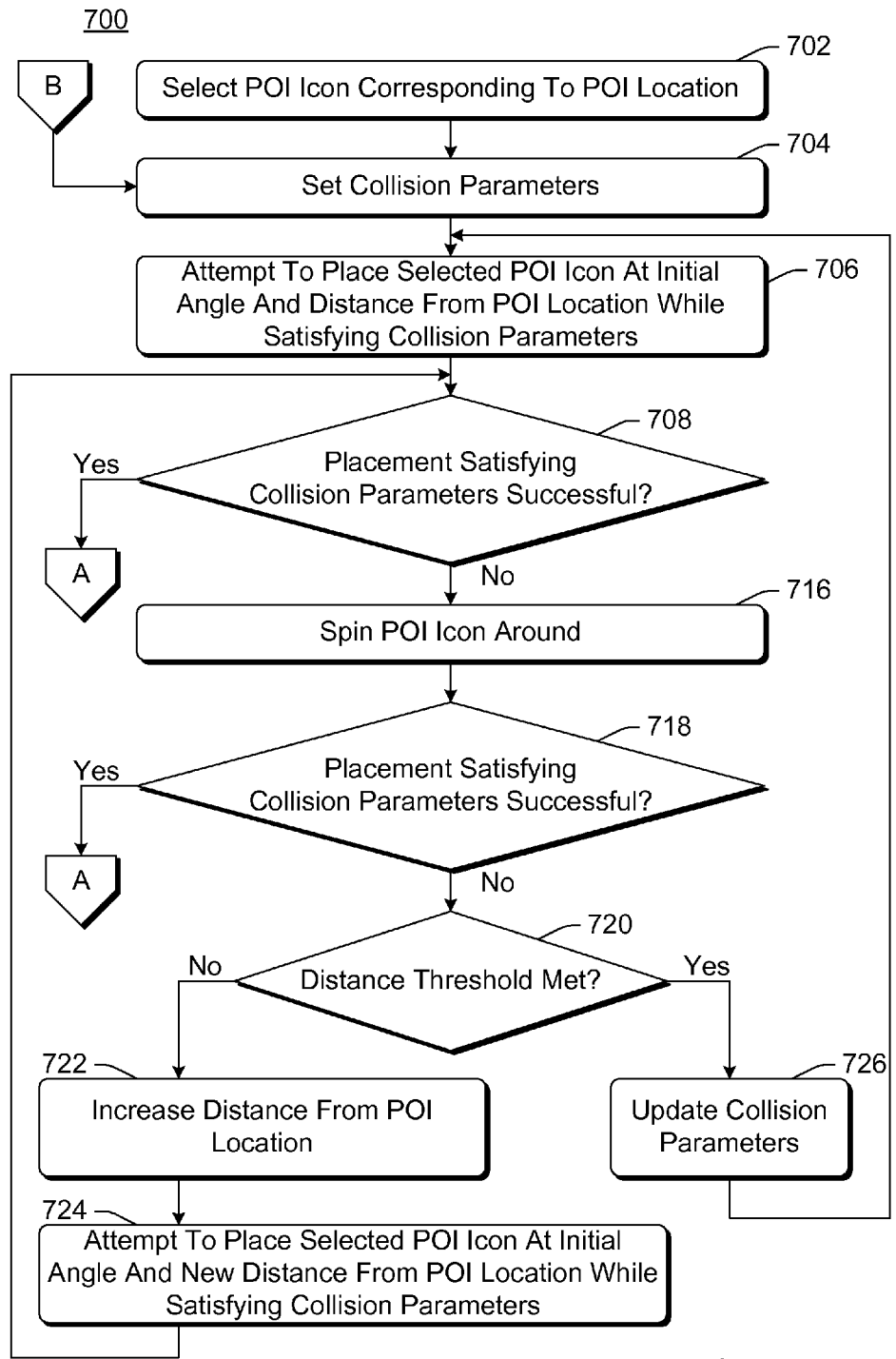
FIGS. 7A and 7B are a flowchart illustrating an example process for placing point-of-interest icons individually.
Figure 7B:
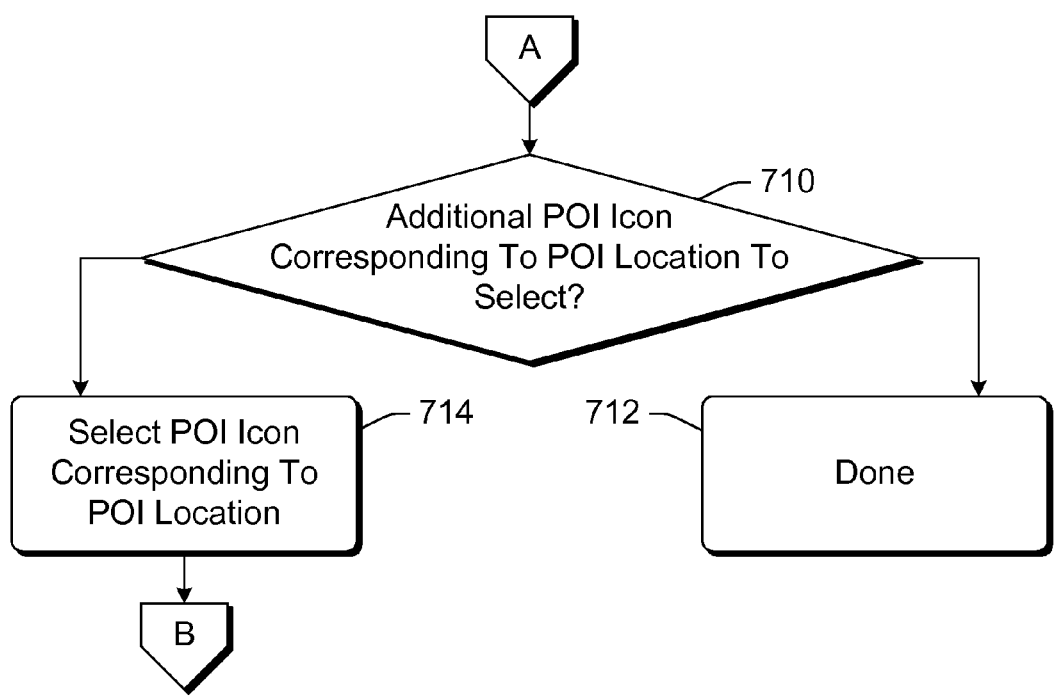

FIGS. 7A and 7B are a flowchart illustrating an example process 700 for placing POI icons individually. Process 700 is carried out by a device, such as a device implementing module 102 of FIG. 1, and can be implemented in software, firmware, hardware, or combinations thereof. In one or more embodiments, process 700 describes act 324 of FIGS. 3A and 3B in additional detail.

Initially, the POI icon corresponding to one of the POI locations is selected (act 702). If there are multiple POI icons to select from in act 702, one of the POI icons can be selected in any of a variety of manners, such as randomly, based on distance between the center of the mini-cluster and the corresponding POI location, and so forth.

Collision parameters are then set (act 704). Different collision parameters can be used, and in one or more embodiments the initial collision parameters that are used are to prevent all collisions. An attempt is then made to place the selected POI icon at an initial angle and distance from the POI location while satisfying the current collision parameters (act 706). This initial angle and distance can be any of a variety of different values. In one or more embodiments, the initial angle is 90 degrees (so the POI icon is vertically above the POI location), and the initial distance is a default distance that varies based on the desires of the system designer (e.g., based on the appearance that he or she desires to create).

A check is then made as to whether the placement in act 706 was successful (act 708). If the placement was successful, then a check is made as to whether there are any additional POI icons corresponding to POI locations in the mini-cluster that have not yet been placed (act 710). If there are no additional POI icons then process 700 is done (act 712). However, if there are additional POI icons then one of those POI icons corresponding to the POI locations is selected (act 714). This selection can be performed in the same manner as discussed above with respect to act 702. Process 700 then proceeds to act 704 to set the collision parameters to the first collision parameters as discussed above.

Returning to act 708, if the placement was not successful, then the POI icon is rotated about the corresponding POI location (act 716), attempting to find a placement of the POI icon that satisfies the current collision parameters. This rotation can be, for example, moving the POI icon one degree at a time, five degrees at a time, one pixel at a time, and so forth. Each time the POI icon is rotated to a new location, a check is made as to whether the POI icon can be successfully placed at that location. A check is then made as to whether the placement in act 716 was successful (act 718). If the placement was successful, then process 700 proceeds to act 710 to check whether there are any additional POI icons corresponding to POI locations in the mini-cluster that have not yet been placed.

However, if the placement was not successful, then a check is made as to whether a distance threshold has been met (act 720). The distance threshold sets a distance beyond which the POI icon is not placed in order to prevent the POI icon from being placed too far away from the POI location. The distance threshold can vary based on the desires of the system designer (e.g., based on the appearance that he or she desires to create).

If the distance threshold has not been met, then the distance of the POI icon from the POI location is increased (act 722). The amount of the increase can vary, such as a single pixel, two pixels, three pixels, a multiple of (e.g., double) the current distance, and so forth. An attempt is then made to place the selected POI icon at an initial angle and the new distance from the POI location while satisfying the current collision parameters (act 724). This initial angle can be any of a variety of different values as discussed above with respect to act 706. Process 700 then returns to act 708 to check whether the placement in act 706 was successful.

Returning to act 720, if the distance threshold has been met then the collision parameters are updated (act 726). Various different collision parameters can be used. The initial collision parameters, discussed above, are to prevent all collisions. If no placement can be made following the initial collision parameters, then the collision parameters are updated to allow collisions. In one or more embodiments, the collision parameters are updated through a series of multiple stages, each of which allows for more collisions. Once the POI icon has been placed, the collision parameters are reset to the initial collision parameters. In one or more embodiments, the series of stages for the collision parameters are:

1) allow collisions between leader lines and other leader lines;
2) allow collisions between leader lines and other leader lines and POI locations; and
3) allow collisions between leader lines and anything.

It is to be appreciated, however, that other collision parameters could alternatively be used.

Thus, in process 700, initially attempts are made to place the POI icon so that it has no collisions. If such attempts are unsuccessful, then attempts are made to place the POI icon allowing collisions between leader lines and other leader lines. If such attempts are unsuccessful, then attempts are made to place the POI icon allowing collisions between leader lines and other leader lines and origin points. If such attempts are unsuccessful, then attempts are made to place the POI icon allowing collisions between leader lines and anything.

Figure 8:
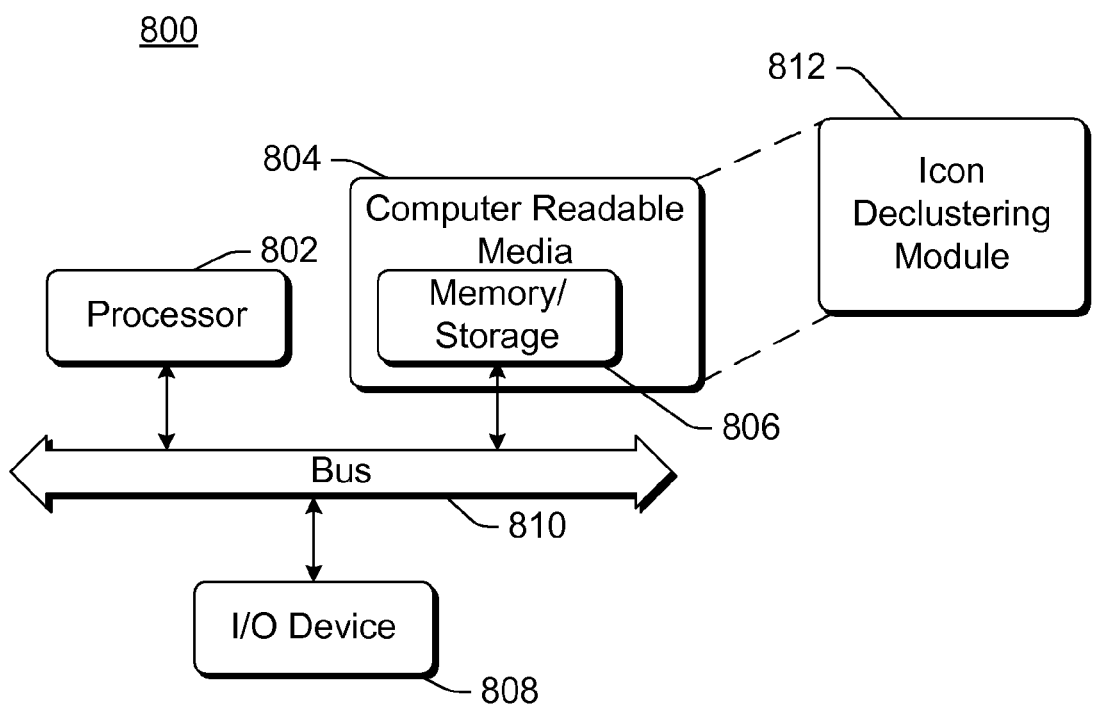
FIG. 8 illustrates an example computing device that can be configured to implement the declustering point-of-interest icons in accordance with one or more embodiments.

FIG. 8 illustrates an example computing device 800 that can be configured to implement the declustering point-of-interest icons in accordance with one or more embodiments. Computing device 800 can implement any of the techniques and processes discussed herein.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or I/O device(s) 808 can be included as part of, or alternatively may be coupled to, computing device 800. Bus 810 represents one or more of any of several types of bus structures, including a memory bus or memory controller, a peripheral bus, an accelerated graphics port, and a processor or local bus using any of a variety of bus architectures. Bus 810 can include wired and/or wireless buses.

Memory/storage component 806 represents one or more computer storage media. Component 806 can include volatile media (such as random access memory (RAM)) and/or non-volatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

In one or more embodiments, computer readable media 804 has stored thereon an icon declustering module 812 to implement the declustering point-of-interest icons discussed herein. Module 812 can be, for example, module 102 of FIG. 1. Icon declustering module 812 includes instructions that are accessed by processor 802 via bus 810. When executed by processor 802, these instructions cause processor 802 to carry out the declustering of POI icons discussed herein. It is to be appreciated that, during execution of icon declustering module 812, different instructions can be stored in different components of computing device 800, such as in processor 802, in various cache memories of processor 802, in other cache memories of device 800 (not shown), on other computer readable media, and so forth.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage devices having stored thereon multiple instructions that, when executed by one or more processors, cause the one or more processors to:
   create super-clusters of point-of-interest locations based on how close the point-of-interest locations are to one another;
   create one or more mini-clusters included in each of the super-clusters based on how close the point-of-interest locations within each super-cluster are to one another; and
   for each of one or more mini-clusters, attempt to place point-of-interest icons corresponding to the point-of-interest locations as a group based at least in part on a mean out positioning vector that is based at least in part on a center of the mini-cluster and a center of the super-cluster that includes the mini-cluster, and for any of the point-of-interest icons that are not successfully placed as a group based on mean out positioning vectors, attempt to individually place each of the point-of-interest icons in a series of stages, the series of stages including at least a first stage that allows no collisions and a second stage that allows collisions only between a leader line of the point-of-interest icon and leader lines of other point-of-interest icons.

2. One or more computer storage devices as recited in claim 1, wherein the instructions further cause the one or more processors to:
   place multiple point-of-interest icons in a first mini-cluster on a circle having a center at the center of the first mini-cluster; and
   rotate the circle to attempt to identify locations for the point-of-interest icons that have no collisions.

3. One or more computer storage devices as recited in claim 2, wherein the instructions further cause the one or more processors to:
   reduce the circle to an arc less than 360 degrees;
   increase a distance between the center of the mini-cluster and the arc; and
   rotate the arc to attempt to identify locations for the point-of-interest icons that have no collisions.

4. One or more computer storage devices as recited in claim 1, wherein each of the point-of-interest icons is attempted to be placed without collision, and wherein collision occurs for a point-of-interest icon when the point-of-interest icon is attempted to be displayed in any pixels in which any other line, point-of-interest icon, or point-of-interest location is displayed.

5. One or more computer storage devices as recited in claim 1, wherein the instruction further caused the one or more processors to place a point-of-interest icon included in one of the one or more mini-clusters along the mean out positioning vector for the one of the one or more mini-clusters.

6. One or more computer storage devices as recited in claim 5, wherein the instructions further cause the one or more processors to rotate the mean out positioning vector about the center of the super-cluster that includes the mini-cluster, attempting to place the point-of-interest icon along the mean out positioning vector as the mean out positioning vector is rotated.

7. One or more computer storage devices as recited in claim 1, wherein the instructions further cause the one or more processors to select super-clusters to have the point-of-interest icons-corresponding to the point-of-interest locations included in the mini-clusters within the super-clusters placed in an order where super-clusters including more point-of-interest locations are selected prior to super-clusters including fewer point-of-interest locations.

8. One or more computer storage devices as recited in claim 1, wherein the instructions further cause the one or more processors to select mini-clusters to have the point-of-interest icons corresponding to the point-of-interest locations included in the mini-clusters placed in an order where mini-clusters having centers closer to the center of the super-cluster that includes the mini-clusters are selected prior to mini-clusters having centers further from the center of the super-cluster.

9. One or more computer storage devices as recited in claim 1, wherein the series of stages further includes:
   a third stage that allows collisions only between the leader line of the point-of-interest icon and leader lines of other point-of-interest icons or other point-of-interest locations.

10. A method comprising:
    creating, by a computing device, super-clusters of point-of-interest locations;
    creating, within each super-cluster, one or more mini-clusters of point-of-interest locations;
    for each mini-cluster having a single point-of-interest location, placing a point-of-interest icon corresponding to the single point-of-interest location for display; and
    for each mini-cluster having multiple point-of-interest locations, attempting to place point-of-interest icons corresponding to the multiple point-of-interest locations as a group, and placing the point-of-interest icons corresponding to the multiple point-of-interest locations individually only if the attempting to place the point-of-interest icons as a group is unsuccessful, the individual placement of the point-of-interest icons comprising attempting to place the point-of-interest icons in a series of stages, the series of stages including at least a first stage that allows no collisions and a second stage that allows collisions only between a leader line of the point-of-interest icon and leader lines of other point-of-interest icons.

11. A method as recited in claim 10, wherein placing the point-of-interest icon corresponding to the single point-of-interest location for a first mini-cluster comprises placing the point-of-interest icon along a mean out positioning vector based at least in part on the single point-of-interest location and a center of the super-cluster that includes the first mini-cluster.

12. A method as recited in claim 10, wherein the series of stages further includes:
    a third stage that allows collisions only between the leader line of the point-of-interest icon and leader lines of other point-of-interest icons or other point-of-interest locations.

13. A method as recited in claim 12, wherein a collision occurs for a point-of-interest icon when the point-of-interest icon is attempted to be located in a same location as any other leader line, point-of-interest icon, or point-of-interest location.

14. A method as recited in claim 10, wherein placing the point-of-interest icons corresponding to the multiple point-of-interest locations individually comprises attempting to place each of the point-of-interest icons using mean out positioning.

15. A method as recited in claim 14, wherein placing the point-of-interest icons corresponding to the multiple point-of-interest locations individually further comprises for any point-of-interest icon that is not placed:
- attempting to place the point-of-interest icon at an initial distance and angle from the corresponding point-of-interest location; and
- if the point-of-interest icon cannot be successfully placed at the initial distance and angle, then attempting to place the point-of-interest icon at locations resulting from spinning the point-of-interest icon around the location at the initial distance.

16. A method as recited in claim 15, wherein placing the point-of-interest icons corresponding to the multiple point-of-interest locations individually further comprises for any point-of-interest icon that is not placed after attempting to place the point-of-interest icon at locations resulting from spinning the point-of-interest icon around the location at the initial distance:
- increasing the distance from the point-of-interest location;
- attempting to place the point-of-interest icon at the increased distance and the angle from the corresponding point-of-interest location; and
- if the point-of-interest icon cannot be successfully place at the increased distance and the angle, then attempting to place the point-of-interest icon at locations resulting from spinning the point-of-interest icon around the location at the increased distance.

17. A method as recited in claim 10, wherein attempting to place the point-of-interest icons as a group comprises:
- placing multiple point-of-interest icons in the mini-cluster on a circle having a center at the center of the mini-cluster; and
- rotating the circle to attempt to identify locations for the point-of-interest icons that have no collisions.

18. A computing device comprising:
a processor; and
a computer readable media having stored thereon instructions that cause the one or more processors to:
- create super-clusters of point-of-interest locations;
- create, within each super-cluster, one or more mini-clusters of point-of-interest locations;
- for each mini-cluster having a single point-of-interest location, place a point-of-interest icon corresponding to the single point-of-interest location for display based at least in part on a mean out positioning vector that is based at least in part on a center of the mini-cluster and a center of the super-cluster that includes the mini-cluster; and
- for each mini-cluster having multiple point-of-interest locations, attempt to place point-of-interest icons corresponding to the multiple point-of-interest locations as a group, and place the point-of-interest icons corresponding to the multiple point-of-interest locations individually only if the attempt to place the point-of-interest icons as a group is unsuccessful, the individual placement of the point-of-interest icons comprising attempting to place the point-of-interest icons in a series of stages, the series of stages including at least a first stage that allows no collisions and a second stage that allows collisions only between a leader line of the point-of-interest icon and leader lines of other point-of-interest icons.

19. A computing device as recited in claim 18, wherein each of the point-of-interest icons is attempted to be placed without collision, and wherein collision occurs for a point-of-interest icon when the point-of-interest icon is attempted to be placed in a same location as any other leader line, point-of-interest icon, or point-of-interest location.

20. A computing device as recited in claim 18, Wherein the series of stages further includes:
- a third stage that allows collisions only between the leader line of the point-of-interest icon and leader lines of other point-of-interest icons or other point-of-interest locations.

* * * * *